H. K. HOLSMAN.
FRICTION DRIVING CHAIN.
APPLICATION FILED JULY 8, 1907. RENEWED AUG. 3, 1911.
1,007,569.
Patented Oct. 31, 1911.
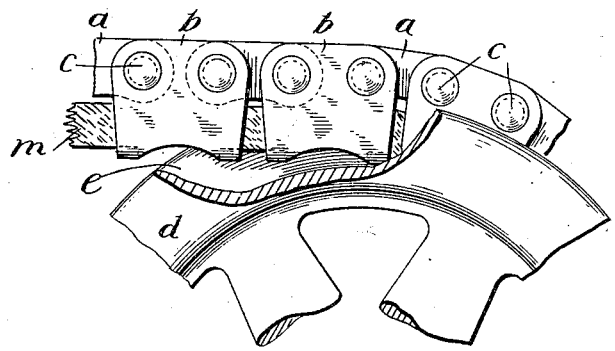
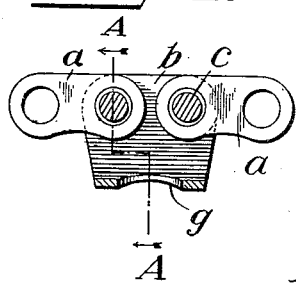
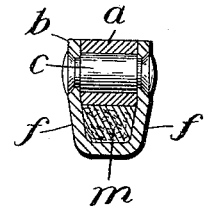
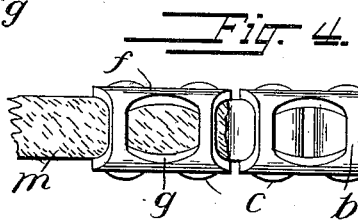
Witnesses:
Inventor:

UNITED STATES PATENT OFFICE.

HENRY K. HOLSMAN, OF CHICAGO, ILLINOIS, ASSIGNOR TO INDEPENDENT HARVESTER COMPANY, A CORPORATION.

FRICTION DRIVING-CHAIN.

1,007,569. Specification of Letters Patent. Patented Oct. 31, 1911.

Application filed July 8, 1907, Serial No. 382,600. Renewed August 3, 1911. Serial No. 642,084.

*To all whom it may concern:*

Be it known that I, HENRY K. HOLSMAN, a citizen of the United States, and a resident of Chicago, in the county of Cook and State of Illinois, have invented certain new and useful Improvements in Friction Driving-Chains, of which the following is a full, clear, and exact specification.

My invention is concerned with a novel and simple chain construction adapted for use with grooved pulleys for friction driving, and which is especially adapted for use in driving automobiles of the types shown in my Patent No. 697,720, but which can of course be used for other purposes.

As these chains have been heretofore constructed, some attached engaging surfaces not forming a part of the link proper have been employed, but in my invention, I simplify and materially improve the construction by forming the engaging surfaces directly on the sides of some or all of the links, so that their simplicity as compared with ordinary chains is not impaired, and their durability, as compared with more complicated chains heretofore employed for friction driving, instead of sprocket driving, is very materially increased.

To illustrate my invention, I inclose herewith a sheet of drawings in which the same reference characters are used to designate identical parts in all the figures, of which—

Figure 1 is a side elevation of a small section of one form of my improved chain shown in connection with the groove of a driving pulley; Fig. 2 is a detail in central longitudinal section; Fig. 3 is a detail in cross section on the line A—A of Fig. 2; and Fig. 4 is a view of the chain seen from the sheave engaging side.

In the specific form of my invention shown in Figs. 1 to 4, I employ a chain in which only the alternate links engage with the driving sheave, and in which the non-engaging links $a$ are of the ordinary block link type, and are riveted to the sheave-engaging links $b$ by the customary chain rivets $c$. The driving sheaves $d$ with which these chains are adapted to be employed have a grooved surface $e$, which has its sides diverging at a suitable angle, say 20°, and the engaging surfaces $f$ of the links $b$ must have the same angle relative to each other. As a preferable method of constructing these links $b$, I first stamp out a suitable blank having the four apertures at its corners for the rivets, and the aperture $g$ at the center, which, while it facilitates the subsequent drawing of the blank into the generally U-shaped cross-section it assumes when it is completed, is provided primarily so that it will make the bearing surfaces $f$ more yielding at their centers, so that they can give or yield inwardly, and thus increase the extent to which they will engage the sheave, as it will be understood that if they were absolutely rigid, the engagement of the surfaces $f$ with the sheave would be merely a line. The links $b$ are preferably composed of spring steel, and have sufficient resiliency to insure a very effective engagement of the links with the groove of the driving sheave, owing to the slight yielding that can occur in the metal of the links.

In order to properly lubricate the joints of the chains and protect them from the dust and dirt to some extent, I may use in connection therewith an oiled rope or strand, composed of felt or some similar fiber that will hold the oil. I have illustrated the first form as employing such a rope $m$, in which case it is conveniently located in the channel formed between the block links $a$ and the sheave-engaging links $b$, as indicated in Figs. 1, 3 and 4. Of course, it will be understood that one or a plurality of such ropes otherwise disposed might be employed, they being so located as to furnish lubricant for the chain, and not to interfere with the contact of the surfaces $f$ with the sheave.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. A friction driving chain having links composed of pieces of sheet-metal, each such link being generally U-shaped in cross-section and shaped to furnish bearing surfaces at an angle to each other and having apertures for connecting rivets therein.

2. A friction driving chain having links composed of pieces of sheet-metal, each such link being shaped to furnish bearing surfaces at an angle to each other, and having an aperture in the bottom of the link and apertures for connecting rivets in the ends thereof.

3. A friction drive chain composed of block links, with connecting links alternating therewith and riveted thereto, and consisting of pieces of sheet-metal, each such sheet-metal link being shaped to furnish bearing surfaces at an angle to each other and having apertures for connecting rivets therein, said bearing surfaces being outside of the planes of the sides of the block links.

4. A chain composed of block links, with connecting links alternating therewith and riveted thereto, said connecting links consisting of pieces of sheet-metal, each such link being shaped to furnish bearing surfaces at an angle to each other, an aperture in the bottom of the link, and apertures for connecting rivets at the ends thereof.

5. A chain composed of rigid links hinged together and having some of the links provided with diverging bearing surfaces formed thereon, and a strand of lubricant-carrying material associated therewith but out of contact with the bearing surfaces.

6. A friction driving chain having links composed of pieces of sheet-metal, each such link being shaped to furnish bearing surfaces at an angle to each other and having apertures for connecting rivets therein, and a strand of lubricant-carrying material associated therewith but out of contact with the bearing surfaces.

7. A friction driving chain having links composed of pieces of sheet-metal formed with hollows therein, each such link being shaped to furnish bearing surfaces at an angle to each other and having apertures for connecting rivets therein, and a strand of lubricant-carrying material lying in the hollows of the links out of contact with the bearing surfaces.

In witness whereof, I have hereunto set my hand and affixed my seal, this 5th day of July, A. D. 1907.

HENRY K. HOLSMAN. [L. S.]

Witnesses:
   JOHN H. MCELROY,
   M. S. REEDER.

---

Copies of this patent may be obtained for five cents each, by addressing the "Commissioner of Patents, Washington, D. C."